United States Patent [19]

Mawson et al.

[11] 4,284,871
[45] Aug. 18, 1981

[54] AUTOMATIC ADJUSTMENT OF THE INITIAL HEIGHT OF A FLAME CUTTER TO A WORKPIECE

[75] Inventors: Maurice Mawson, Cramlinton; Alexander Jamieson, Blyth, both of England

[73] Assignee: Messer Griesheim, Frankfurt am Main, Fed. Rep. of Germany

[21] Appl. No.: 87,350

[22] Filed: Oct. 23, 1979

[30] Foreign Application Priority Data

Nov. 11, 1978 [DE] Fed. Rep. of Germany ....... 2848957

[51] Int. Cl.³ ................................................ B23K 9/10
[52] U.S. Cl. ...................... 219/121 PV; 219/124.02; 219/124.1; 219/121 PY; 219/121 PT; 33/185 R
[58] Field of Search ............ 219/121 P, 124.1, 124.01, 219/124.02, 124.03, 124.13, 124.34; 33/185 R; 315/111.2

[56] References Cited

U.S. PATENT DOCUMENTS

| 3,481,247 | 12/1969 | Hayes | 33/185 R X |
| 3,809,308 | 5/1974 | Roeder et al. | 219/124.02 |
| 4,017,707 | 4/1977 | Brown et al. | 219/124.02 |
| 4,170,727 | 10/1979 | Wilkins | 219/124.03 |

FOREIGN PATENT DOCUMENTS

| 1913126 | 11/1969 | Fed. Rep. of Germany | 219/124.03 |
| 219039 | 5/1968 | U.S.S.R. | 219/124.03 |

*Primary Examiner*—Roy N. Envall, Jr.
*Assistant Examiner*—M. Paschall
*Attorney, Agent, or Firm*—Connolly and Hutz

[57] ABSTRACT

The initial height of a flame cutter to a workpiece located under a liquid is automatically adjusted by jointly moving the flame cutter and a sensor toward the workpiece before the cutting operation until the sensor touches the workpiece surface whereupon a signal is sent for turning off the height adjustment device and for removing the sensor from the workpiece.

5 Claims, 2 Drawing Figures

AUTOMATIC ADJUSTMENT OF THE INITIAL HEIGHT OF A FLAME CUTTER TO A WORKPIECE

BACKGROUND OF INVENTION

The present invention concerns a method for automatic adjustment of the initial height of a flame cutter, particularly an electron or plasma torch, for a workpiece with an irregular surface, which is preferably arranged below a liquid level.

Further the invention relates to a mechanism for implementation of such method. A procedure for maintaining constant distance of a plasma cutter from a workpiece arranged under a liquid level is known from German Patent DE-OS 27 06 232, whereby, for the purpose of distance adjustment, the electrical potential of the electric cutting arc is determined, compared in a reference input element with an index value, and the deviation determined in this manner is conveyed to a height adjustment mechanism for the plasma torch for height correction. In this procedure, which is preferably used for plasma cutting of a workpiece arranged under a liquid level, it is necessary, at the beginning of the cutting process, that the plasma torch is first positioned at a specific initial height of the workpiece, so that the electric cutting arc may then be activated. To date, as can be seen from DE-OS 27 06 232, this initial height, which is dependent on the energy of the cutting art, that is, on the performance of the plasma torch used, has been set manually or automatically via corresponding adjustment devices.

Considering that the workpiece is placed under water and also the viewing conditions resulting from this fact, a hand adjustment is unsatisfactory. A procedure for automatic adjustment of the initial height of a flame cutter is known from German Patent DE-AS 24 27 694, according to which the flame cutter with an attached sensor is first moved towards the workpiece until the sensor touches the workpiece. Subsequently, the cutter is moved back to the desired initial height. This procedure requires a return movement of the cutter and is consequently time consuming.

SUMMARY OF INVENTION

It is thus an object of the invention to create a method of the above first mentioned type, whereby the desired initial height is automatically set already during the downward movement of the flame cutter and the sensor.

In accordance with the invention, prior to the beginning of the cutting process, the flame cutter and a sensor attached to the flame cutter at the desired initial height, are moved towards the workpiece by means of a height adjustment device until the sensor touches the surface of the workpiece, and, at or after the sensor touches the workpiece, a signal is activated which turns off the height adjustment device and turns on a mechanism to remove the sensor from the workpiece.

The problem on which the invention is based is particularly advantageously solved through the inventive procedure, specifically, the cutter is stopped and thus the desired initial height is automatically set already when a desirable initial height is reached during the downward movement of the cutter. This method of positioning is very simple and requires only a very short set-up time.

A particularly advantageous mechanism for implementation of the invention method utilizes a plasma torch with a coordinated height adjustment device, preferably steered through its dependence on plasma arc tension, and it contains, according to the invention, a sensor coordinated with the electronic torch, with the sensor movable in relation to the plasma torch and the workpiece through a lift device. It is preferable that the lift device be designed so that it can be pneumatically activated.

THE DRAWINGS

FIG. 1 is a cross-sectional view in elevation schematically illustrating one practice of the invention; and FIG. 2 illustrates the arrangement of FIG. 1 in different states of operation.

DETAILED DESCRIPTION

Figure 1:
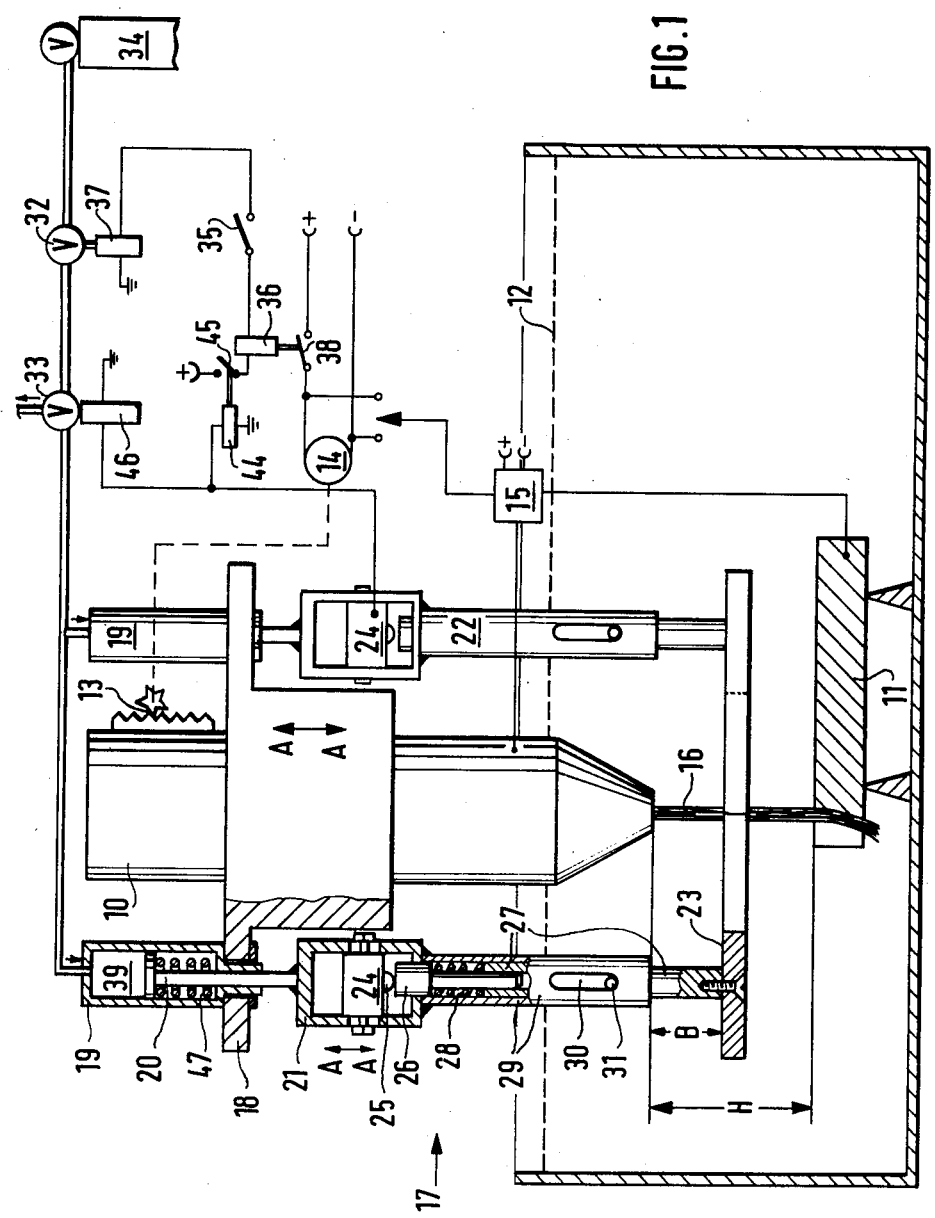

FIG. 1 shows plasma cutting torch 10, which is preferably developed as a water stabilized plasma torch (see also U.S. Pat. No. 3,641,308). A workpiece 11, is located under a liquid level 12, or, alternately, on a liquid table (see also U.S. Pat. No. 3,787,247), is to be cut with the plasma torch. Further a height adjustment device known per se and schematically indicated as 13, is coordinated with the torch 10. The height adjustment device 13 is connected with a motor 14, which maintains a constant distance H between the torch 10 and the workpiece 11 during the cutting, via a regulator unit 15, whereby the arc tension of the plasma arc 16 serves as index value for the height. Height control of this nature is specifically advantageous in case of the described cutting operation under water. A possible execution of such height control is known from German Patent DE-OS 27 06 232.

As explained in the Background of Invention, it is necessary to position the torch at a predetermined initial height H above the workpiece, which is to be done at the outset of the cutting operation, so that the plasma flame can be activated and maintained as a so-called transmitted plasma arc.

According to the present invention, a sensor, represented in its entirety as 17, is coordinated with the torch for the purpose of automatic adjustment. This sensor 17 has a holding flange 18 which has a spring actuated connection with the torch 10. Pneumatic cylinders 19 are provided on the holding flange 18 as a lift device. The pistons 20 of the cylinders 19 are connected with a switch part 21, which, in turn, has a switch connection with a telescope steering 22. A sensor ring 23 is attached to the end of the telescope steering 22. As shown in FIG. 1, a switch 24 is attached to the switch part 21 so that it can slide in the directions of the double arrow A. The switch contact 25 of the switch 24 can be moved by a tappet 26, which can be activated by the telescope bar 27 by intermediate activation of a spring 28. Further, by means of the provided spring 28, a relative movement between the telescope bar 27 and the telescope steering tube 29 is possible after activation of the switch 24, whereby this relative movement is limited by the length of the slot 30 and the corresponding stop screw 31. As can also be seen from FIG. 1, the pneumatic cylinders 19 are connected with a pressure supply unit 34 via a shut-off valve 32 and a vent valve 33.

The procedure according to the invention as well as the further operational mode of the mechanism illustrated in FIG. 1 will be explained in greater detail in conjunction with FIG. 2.

Figure 2:
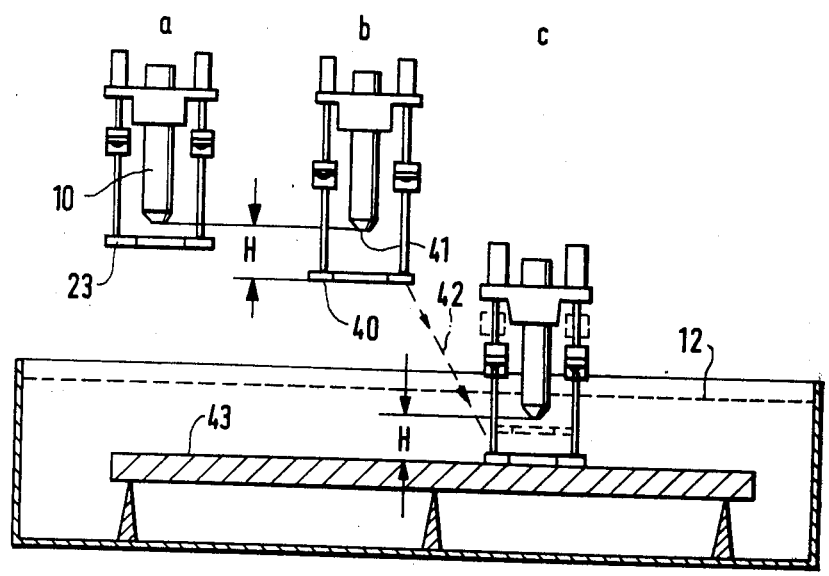

Prior to the beginning of a cutting operation, the flame cutter 10 and the sensor ring 23 are positioned above the liquid level 12, as can be seen from FIG. 2. Thereafter, the contact 35 is closed for automatic setting of the initial height H, whereby the relays 36 and 37 are activated. The relay 36 causes a closing of the contact 38, whereby the motor 14 and, consequently, the sensor attached to the electronic torch, are moved towards the workpiece 11. At the same time, the valve 32 is opened via the relay 37 (valve 33 is set for passage), so that compressed air enters from the pressure supply source 34 into the cylinder chamber 39, whereby the piston 20 is brought to its lower extreme position. The distance of the lower edge 40 (see FIG. 2) of the sensor ring 23 from the cutter top 41 corresponds, in this position, to the desired initial height H. A change of the height can be achieved by corresponding movement of the holding flange 18 in the direction of the double arrow. The cutting torch 10 and the sensor ring 23 now are positioned as illustrated in FIG. 2, stage b. In this position and as indicated by the interrupted line 42, the torch 10 and the sensor ring 23 are moved towards the workpiece 11 by means of the adjustment device 13, 14, until the lower edge 40 of the sensor ring 23 touches the surface 43 of the workpiece. At or immediately after the touch of the workpiece, the contact 25 of the switch 24 is activated by the resulting relative movement of the telescope bar 27 via the spring 28 and the tappet 26, whereby the relay 44 is activated. The relay 44 opens the contact 45, whereby relays 36, 37 are deactivated and thus the height adjustment device 13, 14 turned off. Further, the relay 37 is deactivated and thereby valve 32 closed, and simultaneously, the relay 46 is activated from the switching impulse and the valve 33 set at vent position. This activates the pressure spring 47 which is provided in the cylinders 19, whereby the sensor is lifted from the workpiece and brought to a position corresponding to FIG. 2, as indicated in phantom in stage c. The flame cutter is now positioned at the desired height H above the workpiece 11, and the ignition of the transferred arc can be initiated in the manner known per se, and, after the ignition of the arc, the cutting operation can start. During the cutting operation, the height H is maintained constant by means of the previously described device 15 in conjunction with motor 14 and the torch height setting 13.

In the above-mentioned example, the lift device for the sensor ring 23 is pneumatically developed. Naturally, other lift devices are possible and within the framework of the invention, such as lifting magnets. In addition, it is possible with some advantages and within the framework of the invention, not to use the sensor ring 23 as an element in the height positioning but, for instance, include it by means of a swing bearing as an averaging device. The swing bearing of the sensor 17 would have the advantage that if the sensor ring 23 touches, for example, a higher metal edge or other obstructions in the cutting area an is diverted thereby, an additional switch impulse leads to an immediate disconnection of the entire machine. Devices of this nature are distributed by the assignee hereof under the designation "Havarie-Einrichtungen" ("Averaging Devices").

The present invention is preferable for plasma torch cutters and also usable for cutting of workpieces which are placed at a small distance (a few centimeters) below a liquid level, that is, under water. Naturally, the method according to the invention is also applicable for workpieces which are not placed under a liquid. In addition, instead of plasma torches, oxyacetylene cutting torches or laser cutter heads may be set automatically at a predetermined distance H instead of plasma cutting torches, whereby, corresponding to the most significant advantage of the invention, the positioning of the cutting tool is obtained already while the cutting tool is approaching the workpiece to be processed.

What is claimed is:

1. In an apparatus for automatically setting the initial height of a plasma torch cutter over a workpiece having an irregular surface and disposed under a liquid with the plasma torch cutter having a height setting mechanism which is steered in dependence with the plasma arc, the improvement being a sensor means for effecting relative movement between said sensor and said plasma torch cutter whereby the distance therebetween may be set to correspond to said initial height, coupling means for moving said sensor and said plasma torch jointly as a unit by said height setting mechanism toward the workpiece until said sensor contacts the workpiece, and means responsive to said sensor contacting the workpiece for turning off said height setting mechanism and for retracting said sensor by lifting means away from the operative area of said plasma torch cutter.

2. In a method of automatic setting of the initial height of a flame cutter, such as a plasma torch cutter, over a workpiece to be treated and having an irregular surface and with the workpiece being under a liquid level, the improvement being prior to the beginning of the cutting operation setting the distance between the flame cutter and a sensor to correspond to the desired initial height, lowering the flame cutter and sensor together as a unit towards the workpiece by a height setting means until the sensor touches the surface of the workpiece, and at or after the sensor touches the workpiece actuating a signal in response to the sensor touching the workpiece for turning off the height setting means so that the flame cutter is disposed at the desired height from the workpiece and for retracting the sensor by turning on a lift device for removing the sensor from the operative area of the flame cutter.

3. Apparatus according to claim 1, characterized thereby that said means for lifting said sensor includes a pneumatically operable lift device.

4. Apparatus according to claim 3, characterized thereby that said lift device is provided with a pneumatic cylinder having a piston mechanically connected with a switch part, said switch part having a switch connected to a telescope steering to which a sensor is attached, and said sensor being a sensor ring.

5. Apparatus according to claim 4, characterized thereby that said telescope steering is provided with a telescope bar holding said sensor ring, said telescope bar being movable against the contact of said switch and against a spring in said telescope steering by means of a guide.

* * * * *